(No Model.)

W. P. KOOKOGEY.
SECONDARY BATTERY.

No. 401,953. Patented Apr. 23, 1889.

WITNESSES:
Walter S. Logan
George C. Brainerd

INVENTOR:
William Prescott Kookogey
BY
Salter Storrs Clark
his ATTORNEY.

UNITED STATES PATENT OFFICE.

WILLIAM PRESCOTT KOOKOGEY, OF BROOKLYN, NEW YORK, ASSIGNOR TO THE KOOKOGEY ELECTRIC COMPANY.

SECONDARY BATTERY.

SPECIFICATION forming part of Letters Patent No. 401,953, dated April 23, 1889.

Application filed January 28, 1889. Serial No. 297,801. (No model.)

*To all whom it may concern:*

Be it known that I, WILLIAM PRESCOTT KOOKOGEY, of the city of Brooklyn, in the county of Kings and State of New York, have invented a new and useful Improvement in Storage-Batteries, of which the following is a specification.

My invention relates to an improved arrangement of the positive and negative plates contained in a single battery-jar, both with relation to their position in the jar and their position with regard to each other. Its object is to obviate the common difficulties with regard to buckling, scaling, and gradual destruction of the plates, and also to obtain a battery of greater electrical capacity for a given size.

It consists, first, in arranging the plates in couples, a positive and a negative being placed together back to back with a thin layer of insulating material to separate them, and placing these couples in the liquid of the battery-jar horizontally and in such order that the exposed surface of each positive plate shall be upward, and, second, in placing between any two plates of a galvanic battery a grid or net-work of insulating or low-conducting material, so as to divide the surfaces of the plates exposed opposite to each other into a series of sections, the sections being substantially isolated from each other so far as the liquid is concerned, and making the liquid to be held in each compartment made by the grid of just sufficient strength to effect the desired reduction in the section of the plates with which it comes in contact.

By "positive" plate herein I mean the plate holding or to hold the peroxide of lead, and by the "negative" plate I mean the plate holding or to hold the spongy lead. The word "pair" is not used in its technical electrical sense, but to designate two plates—a positive and negative—placed back to back with insulating material between them.

Figure 1:
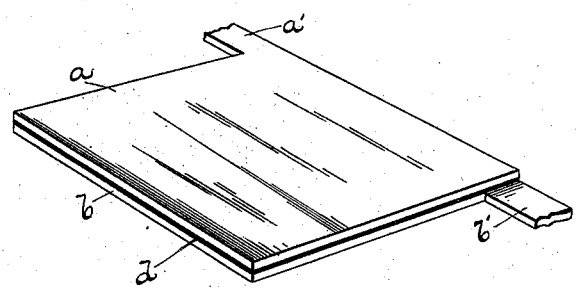
Figure 2:
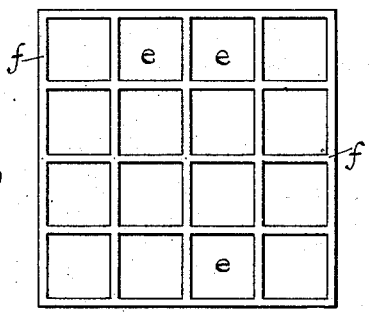

In the drawings sent herewith, in which the same characters indicate analogous parts, Figure 1 is a perspective view of a positive and a negative plate as placed together. Fig. 2 is a plan of a grid or net-work of low-conducting material, called herein a "separator."

Figure 3:
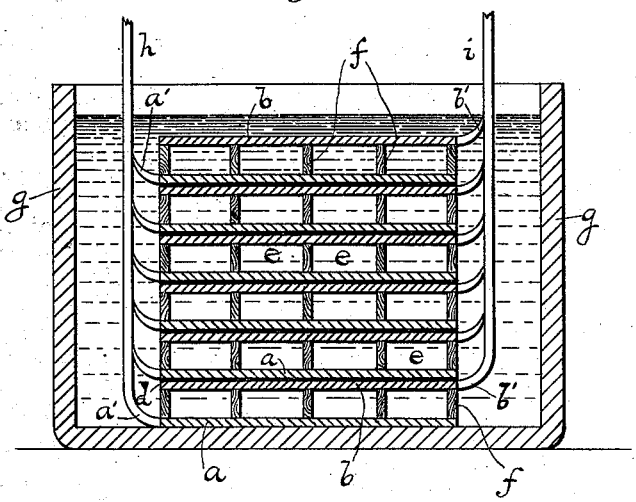

Fig. 3 is a vertical sectional view of a single battery-jar containing a series of plates and separators arranged according to the invention.

The plate $a$ is a positive plate; $b$, a negative plate, and $d$ any appropriate material placed between them to insulate them entirely from each other. The plates $a$ and $b$, with the insulating material between them, constitute what is herein termed a "pair." The battery consists of any appropriate number of such pairs of plates placed within the receptacle $g$, with the separators $f$ placed between the successive pairs. The separators $f$ serve the double purpose of supporting the respective pairs of plates at the right distance from each other, and also of dividing the plates into sections substantially isolated from each other. They would ordinarily retain their position by gravity simply, but might be fastened together in any appropriate manner.

The projections $a'$ and $b'$, leading to the strips $h$ and $i$, connect all the positive plates together and all the negative plates together, respectively, in the usual way. The top and bottom plates of the entire series need not consist of a pair, but may be a single negative and a single positive, respectively. In order to fill all the compartments with the electrolyte, they should be piled up under the surface of the liquid.

The plates $a$ and $b$ may be made of any thickness, and may be formed by reduction from metallic lead; but the most efficient and best way of making the battery under this invention is to take lead foil for the plates, roughen their surfaces a little by dipping in acid, wet them, and place upon them so much red lead and litharge, respectively, as will stick to the plates in their wet and rough condition. The separators $f$ may have their openings $e$ of any shape or size, so that they provide sufficient support for the plates and prevent the pairs touching one another through any possible bending or buckling. The openings $e$ may be made an inch or an inch and a half square, Fig. 2, their depth, Fig. 3, being then calculated, so that each section shall contain just enough electrolyte to reduce the plates $a$ and $b$ to the desired depth. The material of the separators $f$ should be of insulating or low-conducting quality. Wood properly treated to prevent warping may be used with advantage. The material, $d$, between the plates of each pair must be insulating material—such as glass, rubber, acid-proof cement, insulating-varnish, paper dipped in hot paraffine, &c.—in order to prevent all electrical action between the plates composing a pair. In the drawings, for the sake of clearness, the thickness of the plates and of the separators is exaggerated.

The chief advantage of this invention is that scaling and disintegration cannot work the gradual destruction of the battery, for since the positive plate has its surface upward any scaling or disintegration which may occur will leave the scales upon the surface, and the recharge of the battery will cause them to be reattached. Buckling is prevented by the use of the separators $f$. The advantage of dividing the plates into sections substantially isolated from each other and placing in each section sufficient electrolyte to cause only the desired reduction is that the battery is kept under better control than where circulation in the liquid is depended upon. Where circulation is depended upon reduction may go on more quickly at one point than another, and therefore greater thickness of lead must be originally provided than is actually necessary; but where the electrolyte is measured out for each section, as in this invention, the reduction will only go to a predetermined depth and evenly at all points. This also makes the battery of much greater capacity for a given size, for there is no superfluous material.

The arranging of the plates in pairs and placing them horizontally in the battery with the positive plate upward may be applied whether or not the plates are divided by separators into sections isolated from each other. So, also, the separators dividing the plates into sections may be applied as well to plates arranged perpendicularly as to those arranged horizontally; but it is especially applicable to the latter.

I do not claim, broadly, the principle of placing a plate in the cell horizontally; but I know of no prior use of a series of plates arranged in pairs with insulating material between the pairs and having the positive plate on top. It is not new to put separators between the plates of a cell to prevent the plates touching; but it is new to divide the surfaces of the plates into isolated sections.

I claim as my invention—

1. A storage-battery consisting of a receptacle for containing the electrolyte and a series of pairs of positive and negative plates placed horizontally therein, each pair consisting of a positive and a negative plate placed together with insulating material between them, and the positive plate of each of these pairs being placed on top, substantially as and for the purpose described.

2. In a storage-battery, the combination of a positive plate, a negative plate, and a grid or net-work of low-conducting material placed between them and dividing each of them into isolated sections, substantially as and for the purpose described.

3. A storage-battery consisting of a receptacle containing the electrolyte, a series of pairs of positive and negative plates placed horizontally therein, each pair consisting of a positive and a negative plate placed together with insulating material between them, and the positive plate of each pair being placed on top, and a grid or net-work of low-conducting material placed between the successive pairs and dividing the exposed surfaces of the plates into isolated sections, substantially as and for the purpose described.

4. A storage-battery consisting of a receptacle for containing the electrolyte and a series of pairs of positive and negative plates placed horizontally therein, each pair consisting of a positive and a negative plate placed together with insulating material between them, substantially as and for the purpose described.

5. A storage-battery consisting of a receptacle for containing the electrolyte and a series of pairs of positive and negative plates, each pair consisting of a positive and a negative plate placed together with insulating material between them, and the several pairs being laid horizontally and resting by gravity upon strips of insulating or low-conducting material placed between the successive pairs, substantially as and for the purpose described.

6. A storage-battery plate consisting (before reduction) of two sheets of lead in contact with a sheet of insulating material which lies between them and insulates them from each other, substantially as and for the purpose described.

In witness whereof I have hereunto signed my name, this 26th day of January, 1889, in the presence of two witnesses.

WILLIAM PRESCOTT KOOKOGEY.

Witnesses:
SALTER STORRS CLARK,
MARY KEATING.